US008813290B1

(12) United States Patent
Morris

(10) Patent No.: US 8,813,290 B1
(45) Date of Patent: Aug. 26, 2014

(54) OPERABLE RAMP

(71) Applicant: Donald Morris, Littleton, CO (US)

(72) Inventor: Donald Morris, Littleton, CO (US)

(73) Assignee: Lift-U, division of Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 14/089,652

(22) Filed: Nov. 25, 2013

(51) Int. Cl.
*B65G 69/28* (2006.01)
*B66B 9/02* (2006.01)

(52) U.S. Cl.
USPC ............................ 14/71.3; 187/200; 414/921

(58) Field of Classification Search
USPC .......... 105/431, 447, 448, 449; 14/71.1, 71.3; 187/200; 414/921
See application file for complete search history.

(56) References Cited

U.S. PATENT DOCUMENTS

| | | | | |
|---|---|---|---|---|
| 853,384 | A * | 5/1907 | Tolnes | 16/272 |
| 3,955,827 | A * | 5/1976 | Wonigar | 280/166 |
| 4,022,337 | A | 5/1977 | Eichenhofer | |
| 4,027,807 | A | 6/1977 | Thorley | |
| 4,081,091 | A | 3/1978 | Thorley | |
| 4,124,096 | A | 11/1978 | Dudynskyj | |
| 4,124,098 | A | 11/1978 | Dudynskyj | |
| 4,124,099 | A | 11/1978 | Dudynskyj | |
| 4,164,292 | A | 8/1979 | Karkau | |
| 4,176,999 | A | 12/1979 | Thorley | |
| 4,180,366 | A | 12/1979 | Roth | |
| 4,251,179 | A | 2/1981 | Thorley | |
| 4,270,630 | A | 6/1981 | Karkau | |
| 4,285,416 | A | 8/1981 | Dudynskyj | |
| 4,559,659 | A | 12/1985 | Hunter, Jr. | |
| 4,583,466 | A | 4/1986 | Reddy | |
| 5,150,659 | A * | 9/1992 | Bickel | 105/447 |
| 5,230,288 | A | 7/1993 | Bickel | |
| 5,284,414 | A | 2/1994 | Kempf | |
| 5,316,432 | A | 5/1994 | Smalley | |
| 5,425,615 | A | 6/1995 | Hall | |
| 5,439,342 | A | 8/1995 | Hall | |
| 5,454,196 | A | 10/1995 | Gaines | |
| 6,082,751 | A * | 7/2000 | Hanes et al. | 280/163 |
| 6,558,106 | B2 * | 5/2003 | Sardonico | 414/556 |
| 6,764,123 | B1 | 7/2004 | Bilyard | |
| 7,326,024 | B2 * | 2/2008 | Cohn et al. | 414/546 |
| 7,500,818 | B1 * | 3/2009 | Johnson | 414/556 |
| 7,681,272 | B2 | 3/2010 | Morris | |
| 7,870,631 | B2 * | 1/2011 | Morris et al. | 14/71.3 |
| 8,122,553 | B1 * | 2/2012 | Johnson et al. | 14/71.3 |
| 8,132,281 | B1 * | 3/2012 | Johnson et al. | 14/71.3 |
| 8,181,300 | B1 * | 5/2012 | Johnson et al. | 14/71.3 |
| 8,230,539 | B2 * | 7/2012 | Morris et al. | 14/71.1 |
| 8,250,693 | B1 * | 8/2012 | Johnson et al. | 14/71.3 |

(Continued)

*Primary Examiner* — Gary Hartmann
(74) *Attorney, Agent, or Firm* — Christensen O'Connor Johnson Kindness PLLC

(57) ABSTRACT

An operable ramp is moveable between a stowed position and a deployed position. The operable ramp includes a support element and an inner ramp rotatable at a first end about a first axis. The operable ramp further includes an outer ramp rotatably coupled to a second end of the inner ramp about a second axis. The outer ramp has a first cam follower that engages a slot formed in the support element. A drive assembly selectively rotates the inner ramp relative to the outer ramp, such that rotation of the inner ramp in a first direction moves the second axis from a raised position to a lowered position. The operable ramp forms a step in the stowed position, and the outer ramp and the inner ramp form an inclined transition between a first surface and a second surface when the operable ramp is in the deployed position.

6 Claims, 14 Drawing Sheets

(56) References Cited

U.S. PATENT DOCUMENTS 8,359,691 B2 * 1/2013 Morris et al. .................. 14/71.3
8,375,496 B1 * 2/2013 Johnson et al. ................ 14/71.3
8,505,141 B1 * 8/2013 Morris et al. .................. 14/71.3
8,631,529 B1 * 1/2014 Johnson et al. ................ 14/71.3
8,635,729 B1 * 1/2014 Johnson et al. ................ 14/71.3

* cited by examiner

OPERABLE RAMP

BACKGROUND

The Americans with Disabilities Act (ADA) requires the removal of physical obstacles to those who are physically challenged. The stated objective of this legislation has increased public awareness and concern over the requirements of the physically challenged. Consequentially, there has been more emphasis on providing systems that enable physically challenged people to access buildings and other architectural structures that have a step at the point of ingress or egress.

Installing a fixed ramp is a common way to provide the physically challenged with access to a building with one or more steps at the entrance. Fixed ramps take up a large amount of space and often detract from the aesthetic qualities of the building. Fold out ramps, similar to those used in vehicles can be utilized, but deployment often requires a large area into which the ramp deploys. Accordingly, there is a need for a ramp that provides access to a building with a step at the entrance, while minimizing the space required by the ramp.

SUMMARY

A first embodiment of an operable ramp is moveable between a stowed position and a deployed position. The operable ramp includes a support element and an inner ramp rotatable at a first end about a first axis. The operable ramp further includes an outer ramp rotatably coupled to a second end of the inner ramp about a second axis. The outer ramp has a first cam follower that engages a slot formed in the support element. A drive assembly selectively rotates the inner ramp relative to the outer ramp such that rotation of the inner ramp in a first direction moves the second axis from a raised position to a lowered position. The operable ramp forms a step in the stowed position, and the outer ramp and the inner ramp cooperate to form an inclined transition between a first surface and a second surface when the operable ramp is in the deployed position.

A second embodiment of an operable ramp is moveable between a step configuration in a stowed position and a ramp configuration in a deployed position. The operable ramp includes a support element, an inner ramp, and an outer ramp. A first end of the inner ramp is rotatable about a first axis. The outer ramp is rotatably coupled to a second end of the inner ramp about a second axis. The outer ramp also slidingly engages the support element. The operable ramp further includes a drive arm that is rotatable about a third axis and slidingly engages the outer ramp. The drive arm selectively moves the operable ramp between the stowed position and the deployed position. In the stowed position, the outer ramp is horizontally disposed above the inner ramp. In the deployed position, the outer ramp extends outwardly from the second end of the inner ramp to form an inclined transition between a first surface and a second surface.

A third embodiment of an operable ramp is moveable between a stowed position and a deployed position. The operable ramp includes a support element, an inner ramp, and an outer ramp. A first end of the inner ramp is rotatable about a first axis. The outer ramp is rotatably coupled to a second end of the inner ramp about a second axis. The outer ramp also slidingly engages the support element. A drive assembly is operably coupled to the outer ramp to drive the operable ramp through a deployment motion. During the deployment motion, the second end of the inner ramp moves from a raised position to a lowered position, and the outer ramp rotates about the second axis. During a first phase of the deployment motion, the outer ramp slides in a first direction relative to the support element. During a second phase of the deployment motion, the outer ramp slides in a second direction opposite the first direction relative to the support element.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Exemplary embodiments of the presently disclosed operable step will now be described with reference to the accompanying drawings, where like numerals correspond to like elements. Exemplary embodiments of the disclosed subject matter are directed to operable ramps, and more specifically, to ramp assemblies that are selectively moveable between a stowed "step" position and a deployed "ramp" position. In particular, several embodiments of the present invention are directed to operable ramps for use in architectural settings such as building entrances in which the indoor and outdoor levels differ, for example, when the building entrance includes a step.

The following discussion proceeds with reference to examples of operable ramps suitable for use at building entrances wherein there is a change in elevation, i.e., a step up or step down. While the examples provided herein have been described with reference to their association with building entrances, it will be apparent to one skilled in the art that this is done for illustrative purposes and should not be construed as limiting the scope of the disclosed subject matter, as claimed. Thus, it will be apparent to one skilled in the art that aspects of the disclosed operable ramp may be employed in a number of architectural settings, wherein a change in elevation, such as a step, provides an obstruction to a person with limited mobility.

The following detailed description may use illustrative terms such as higher, lower, inner, outer, vertical, horizontal, front, rear, proximal, distal, etc.; however, these terms are descriptive in nature and should not be construed as limiting. Further, it will be appreciated that embodiments of the disclosed subject matter may employ any combination of features.

Figure 1:
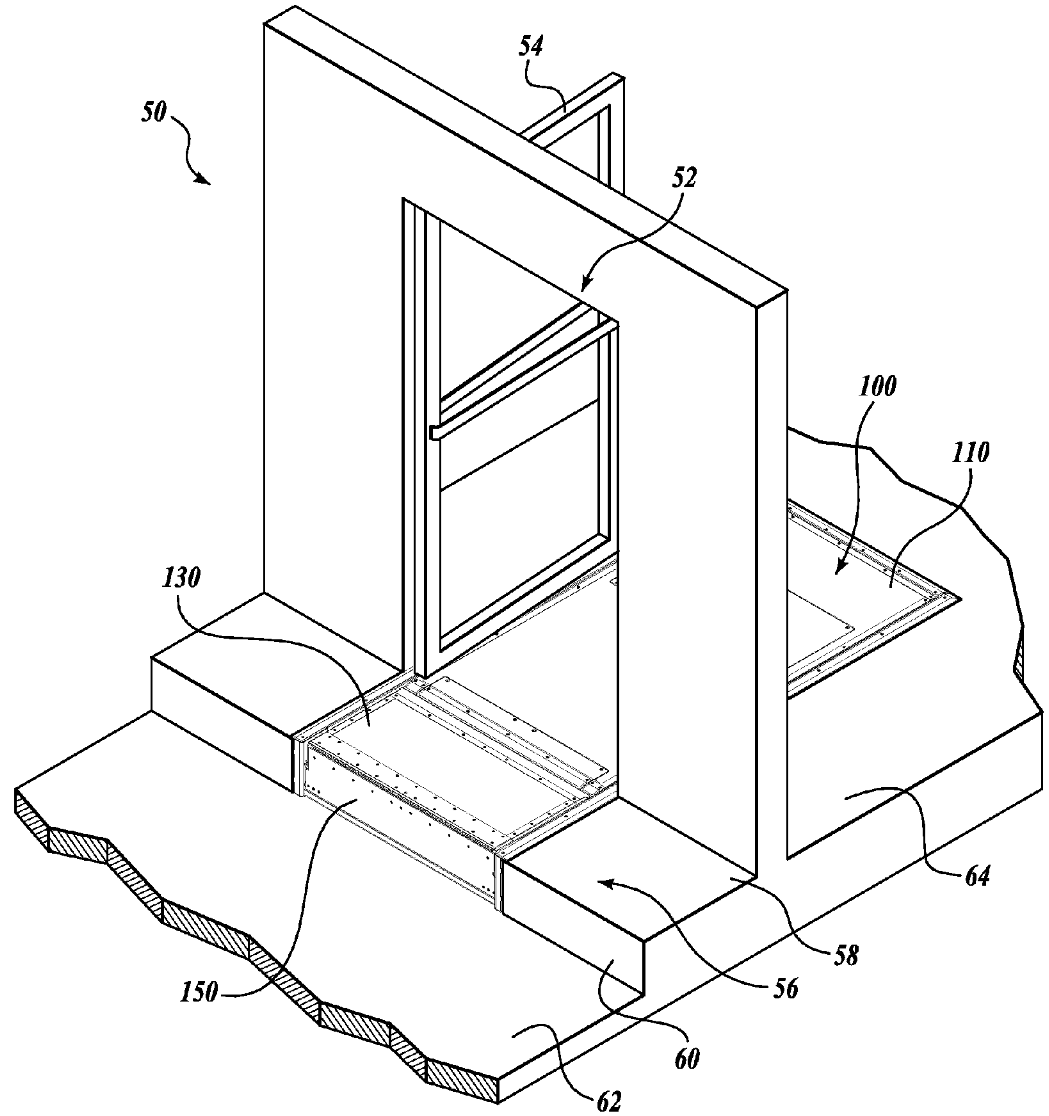
FIG. 1 shows an isometric view of an exemplary embodiment of an operable ramp installed in an architectural setting with the operable ramp in a stowed position.
Figure 2:
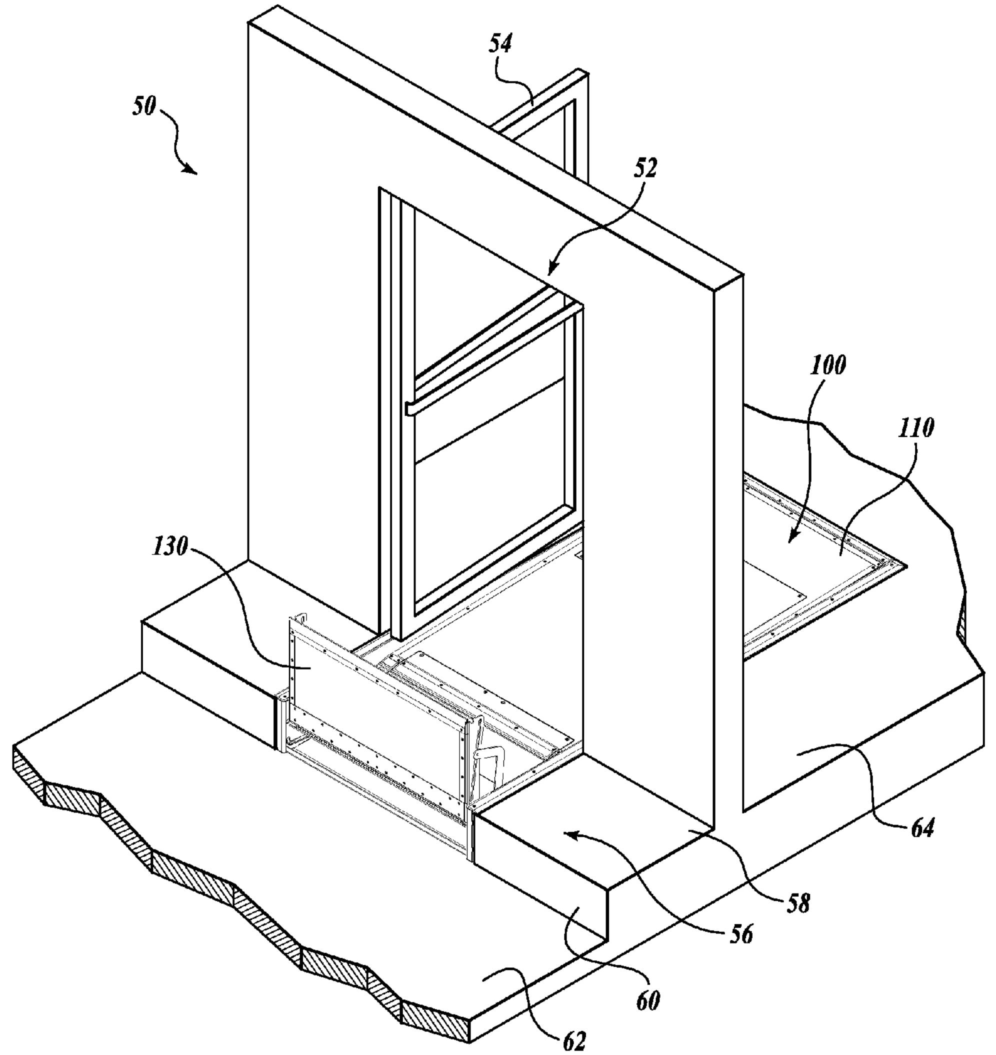
FIG. 2 shows an isometric view of the operable ramp of FIG. 1 in a transition position.
Figure 3:
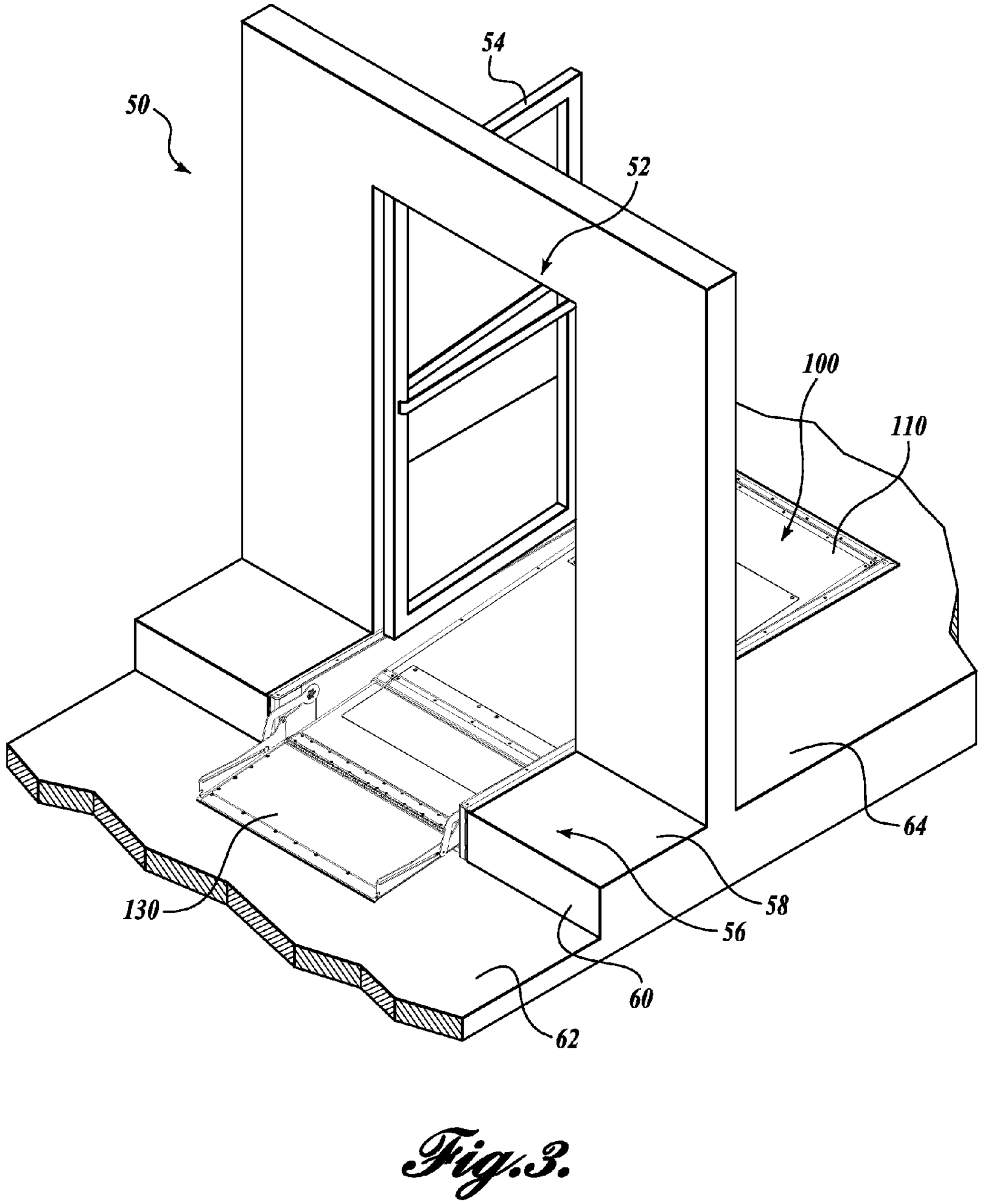
FIG. 3 shows an isometric view of the operable ramp of FIG. 1 in a deployed position.
Figure 4:
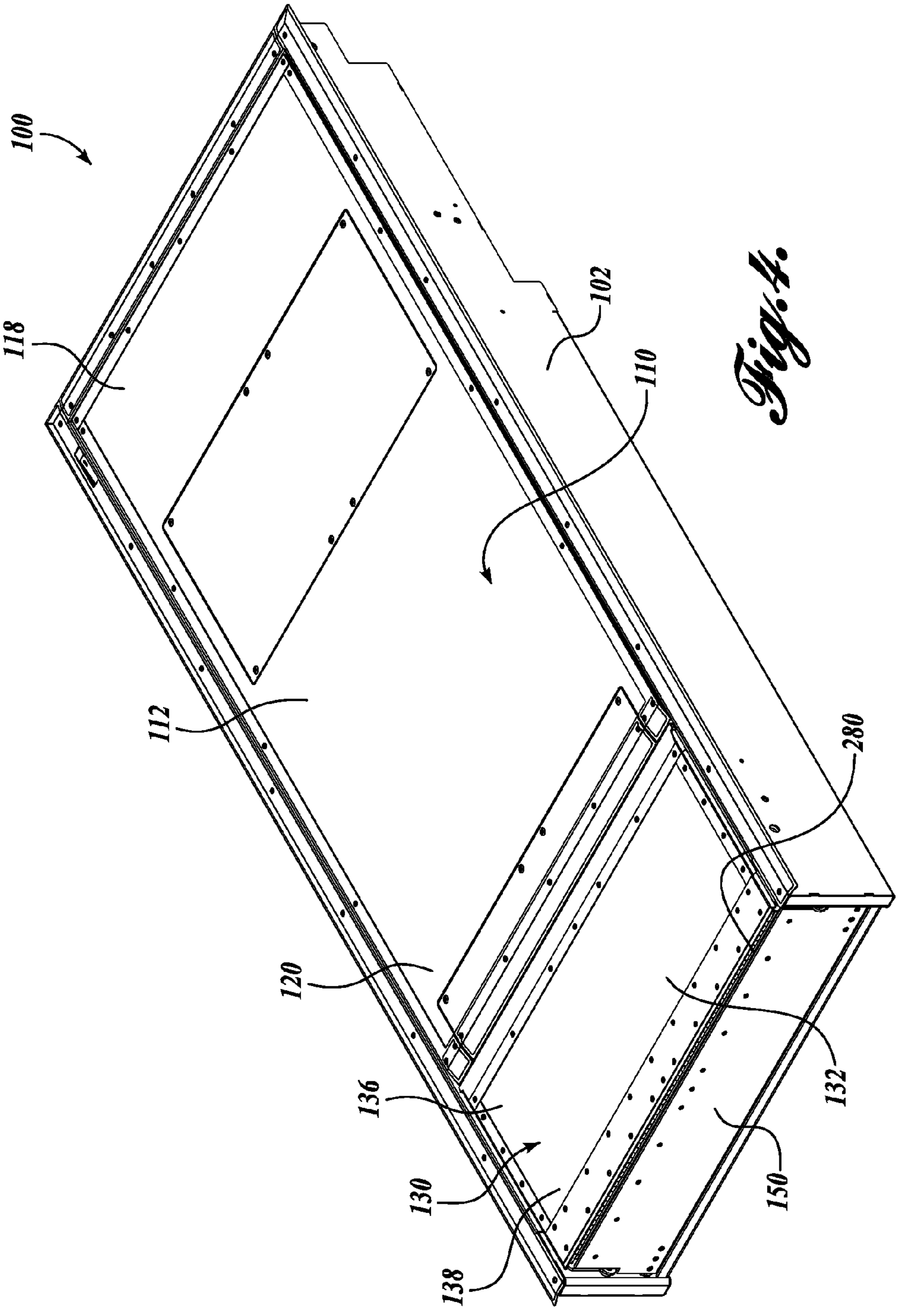
FIG. 4 shows an isometric view of the operable ramp of FIG. 1 in the stowed position.
Figure 5:
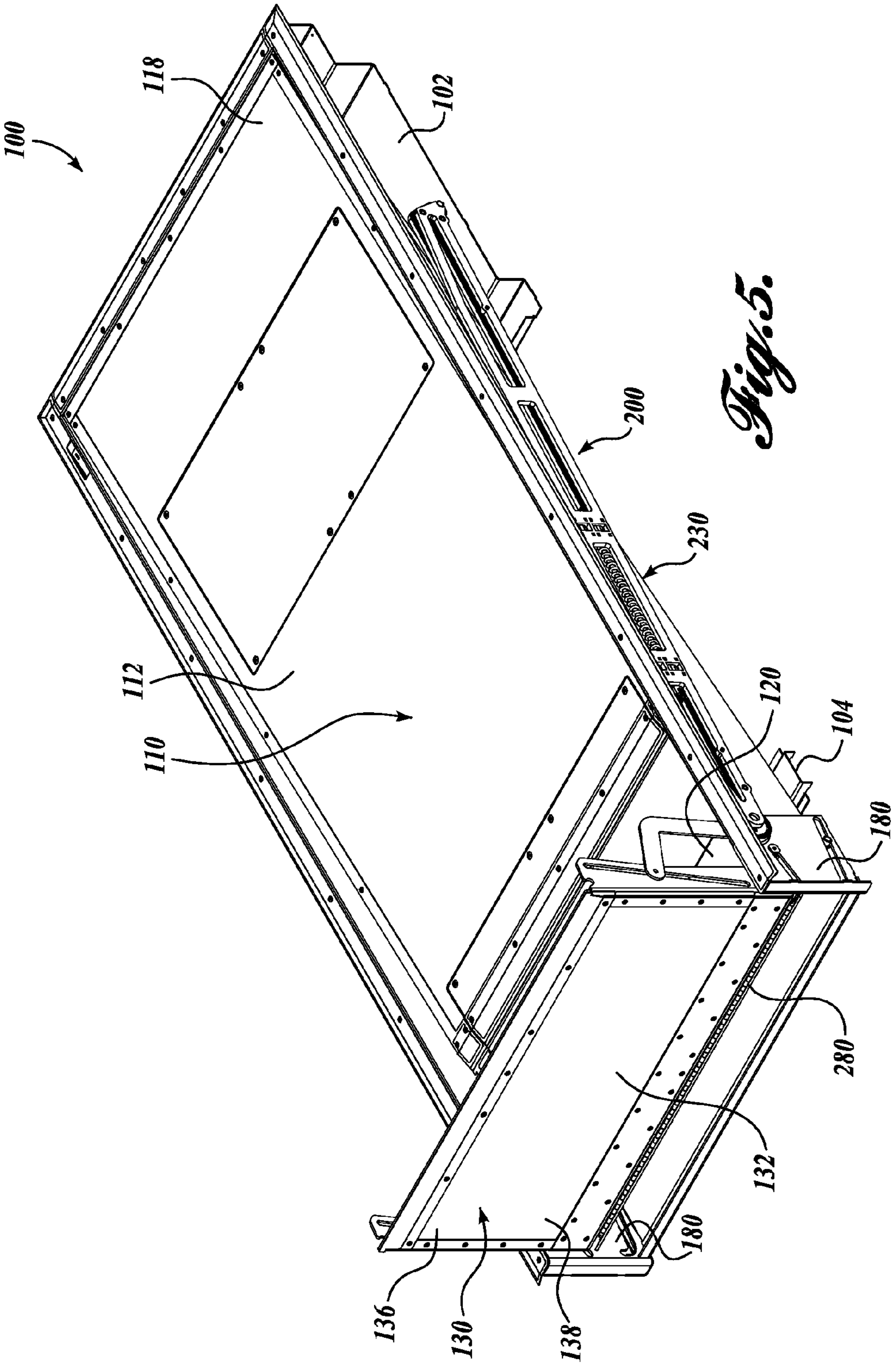
FIG. 5 shows an isometric view of the operable ramp of FIG. 4 in the transition position with a portion of the frame removed.
Figure 6:
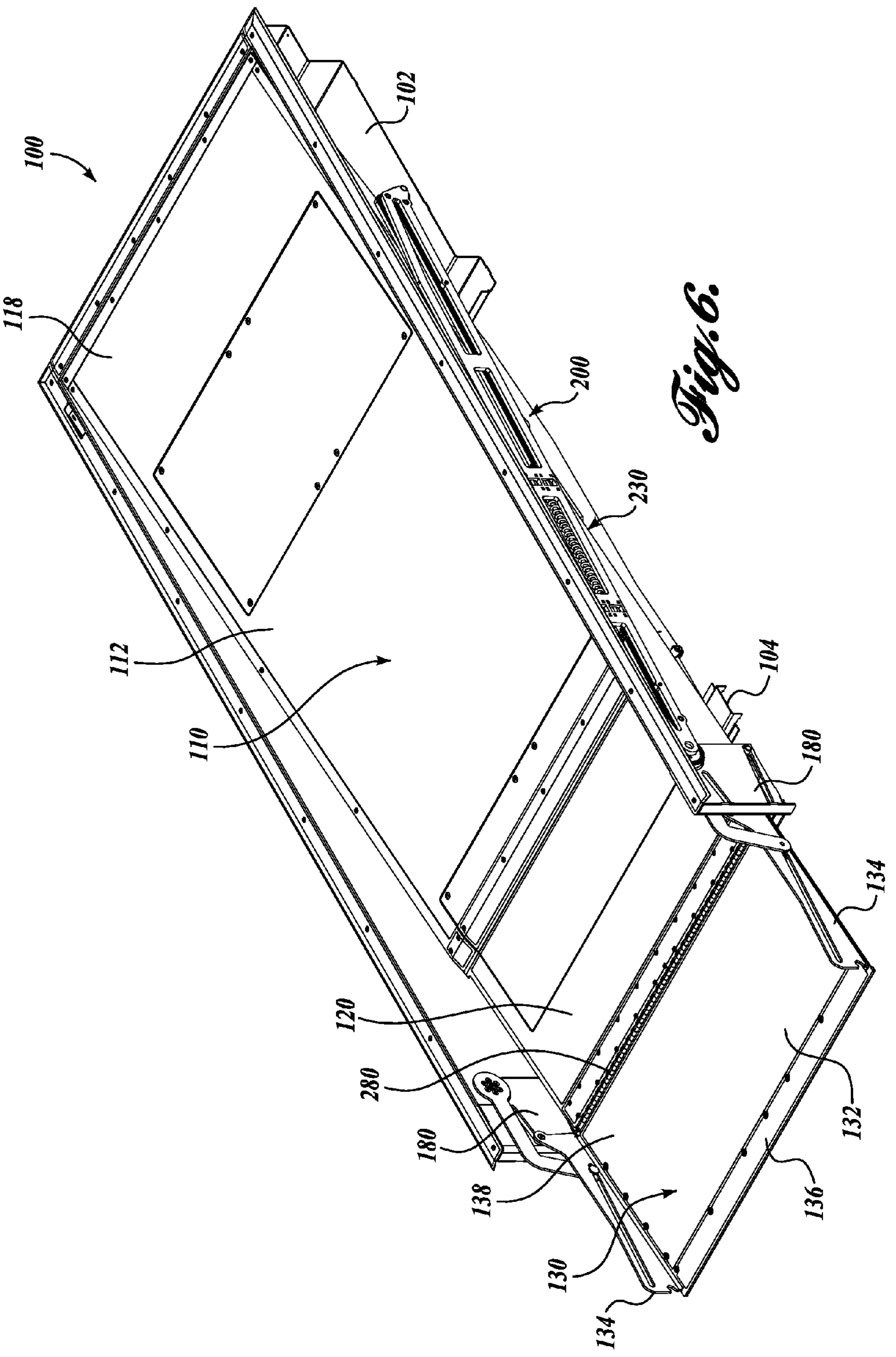
FIG. 6 shows an isometric view of the operable ramp of FIG. 4 in the deployed position with a portion of the frame removed.

FIGS. 1-6 show an exemplary embodiment of an operable ramp 100. More specifically, FIGS. 1-3 show the operable ramp 100 shown installed at the entrance 52 of a building 50, and FIGS. 4-6 show the same embodiment in isolation, i.e., not installed. Referring to FIGS. 1-3, the entrance 52 includes a door 54 with a step 56 positioned outside of the door. The step includes a tread portion 58 and a riser portion 60. The tread portion 58 of the step 56 is level with the floor of the building 50 so that a person walking into the building uses the step to step up from a lower first surface 62 outside the building to a higher second surface 64 inside the building. It will be appreciated that the illustrated installation of the operable ramp 100 is exemplary only and should not be considered limiting. In this regard, the operable ramp 100 can be installed in any number of architectural settings having a step that would present an obstacle for a disabled person.

The operable ramp 100 includes an inner ramp 110 and an outer ramp 130 that cooperate to provide a transition between the first surface 62 and the second surface 64. FIGS. 1 and 4 show the operable ramp 100 in a stowed position. In the stowed position, the operable ramp 100 forms a step such that the inner ramp 110 and outer ramp 130 are generally horizontal and flush with the second surface 64. Thus, the inner ramp 110 and the outer ramp 130 act as a tread that transitions into the second surface 64. The operable ramp 100 also has a closeout assembly 150 that forms a riser when the operable ramp is in the stowed position.

During deployment, the operable ramp 100 moves from the stowed position of FIGS. 1 and 4 through the transition position shown in FIGS. 2 and 5 to the deployed position of FIGS. 3 and 6. As the ramp is deployed, the outer ramp 130 rotates outwardly away from the inner ramp 110. During this deployment motion, the inner ramp 110 rotates about its inner end 118 to lower the outer end 120 of the inner ramp.

In the deployed position of FIGS. 3 and 6, the inner ramp 110 slopes downward from its inner end 118, and the outer ramp 130 extends outward from the outer end 120 of the inner ramp. As a result, the inner ramp 110 and the outer ramp 130 cooperate to form a sloped transition surface that extends from the lower first surface 62 to the higher second surface 64.

The operable ramp 100 includes a frame 102. The frame provides a structure with a fixed position to which the components of the operable ramp 100 are attached. To install the operable ramp 100 in an architectural setting, the frame is attached to surrounding structure to secure the operable ramp in place. Although the illustrated embodiments of the operable ramp 100 include a frame 102, other embodiments are contemplated in which the operable ramp 100 does not include a frame. To install such embodiments in architectural settings, the operable ramp 100 components are attached directly to the surrounding structure or to suitable structure within the building, thus making a frame 102 unnecessary. Similarly, when such embodiments are installed in stationary installations, such as residential buildings and the like, the operable ramp 100 components are optionally attached to the structure of the building or any other suitable structure within the building. Accordingly, embodiments of the described operable ramp 100 that do not include a frame 102 should be considered within the scope of the present disclosure.

Referring to FIGS. 4-10, the inner ramp 110 is constructed from well-known materials. The inner ramp 110 includes a generally flat panel 112 and a plurality of longitudinally extending inner panel supports 114 disposed beneath the panel 112. The inner ramp 110 is rotatably associated at its inner end 118 to the frame 102 about a fixed axis 260. The axis 260 maintains a horizontal orientation so that the inner ramp 110 is rotatable about the axis to reciprocate between a raised position when the operable ramp 100 is in the stowed position and a lowered position when the operable ramp is in the deployed position.

In the illustrated embodiment, the inner ramp 110 has a pin extending from each inner panel support 114. Each pin engages a cradle associated with the frame 102 so that the pins act as a hinge to maintain a rotating association between the inner ramp 110 and the frame, while allowing the inner end 118 of the inner ramp 110 to be lifted out of the cradle to provide access to the interior of the operable ramp. It will be appreciated that the illustrated embodiment is exemplary only and should not be considered limiting. In this regard, the inner ramp 110 can be rotatably associated with the frame or any other fixed structure by a number of suitable configurations, and such configurations should be considered within the scope of the present disclosure.

Still referring to FIGS. 4-10, the outer ramp 130 includes a panel 132 constructed from well-known materials. The outer ramp 130 further includes side curbs 134 that extend upwardly from the sides of the panel 132. As will be described in greater detail, the side curbs 134 engage the drive assembly 200 to drive the operable ramp 100 between the stowed and deployed positions.

The outer ramp 130 has a first end 136 that contacts the lower first surface 62 when the operable ramp 100 is in the deployed position. In the illustrated embodiment, the first end 136 of the outer ramp 130 is tapered to provide a smooth transition between the outer ramp and the lower first surface 62 when the operable ramp 100 is in a deployed position, although such a feature may not be necessary, depending on the thickness of the outer ramp.

The outer ramp 130 is rotatably connected at a second end 138 to the outer end 120 of the inner ramp 110 about an axis 262. As best shown in FIG. 6, the inner ramp 110 and the outer ramp 130 of the illustrated operable ramp 100 are connected with a single continuous hinge 280 i.e., a "piano hinge;" however, it will be appreciated that multiple hinges or any other configuration suitable for rotatably connecting the inner ramp 110 to the outer ramp 130 can be utilized.

The axis 262 maintains a horizontal orientation so that the outer ramp 130 is rotatable about the axis to reciprocate between the stowed position and the deployed position. In the stowed position, shown in FIGS. 4 and 7, the outer ramp 130 extends inwardly from the axis 262 such that the outer ramp is disposed over the inner ramp 110. In the illustrated embodiment, the inner ramp 110 is jogged so that when the operable ramp 100 is in the stowed position, the upper surface of the outer ramp 130 is flush with the upper surface of inner portion of the inner ramp 110. Thus, the inner ramp 110 and outer ramp 130 cooperate to provide a substantially flat surface upon which able-bodied persons can walk while entering and exiting the building.

Figure 10:
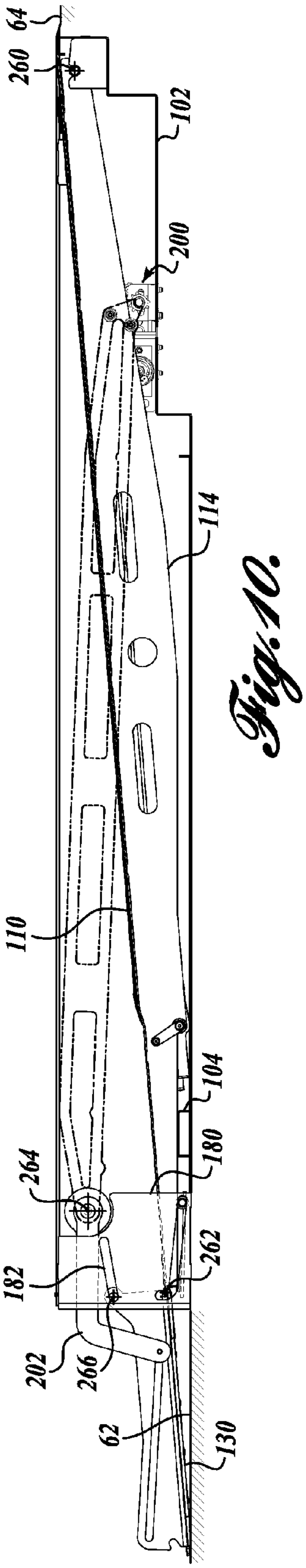
FIG. 10 shows a side view of the operable ramp of FIG. 7 in the deployed position.

When operable ramp 100 is in a deployed position, such as the one shown in FIGS. 6 and 10, the outer ramp 130 extends in an outward and downward direction from the inner ramp 110, which itself has a downward slope. As a result, the inner ramp 110 and the outer ramp 130 cooperate to provide an inclined transition surface between the lower first surface 62 and the higher second surface 64.

FIGS. 5-10 show a pair of supports 180 fixedly positioned relative to the frame 102 at the outer end of the operable ramp 100, with one support 180 located at each side of the operable ramp. For the sake of clarity, one support 180 is described herein with the understanding that unless otherwise indicated, each element of the described support has a corresponding element on the other support.

Figure 11:
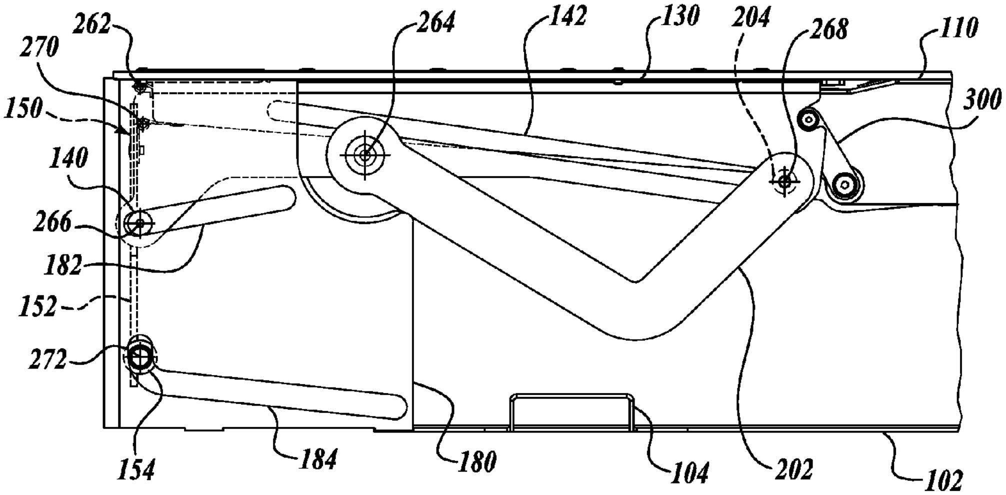
FIG. 11 shows a partial side view of the operable ramp of FIG. 1 in the stowed position.
Figure 12:
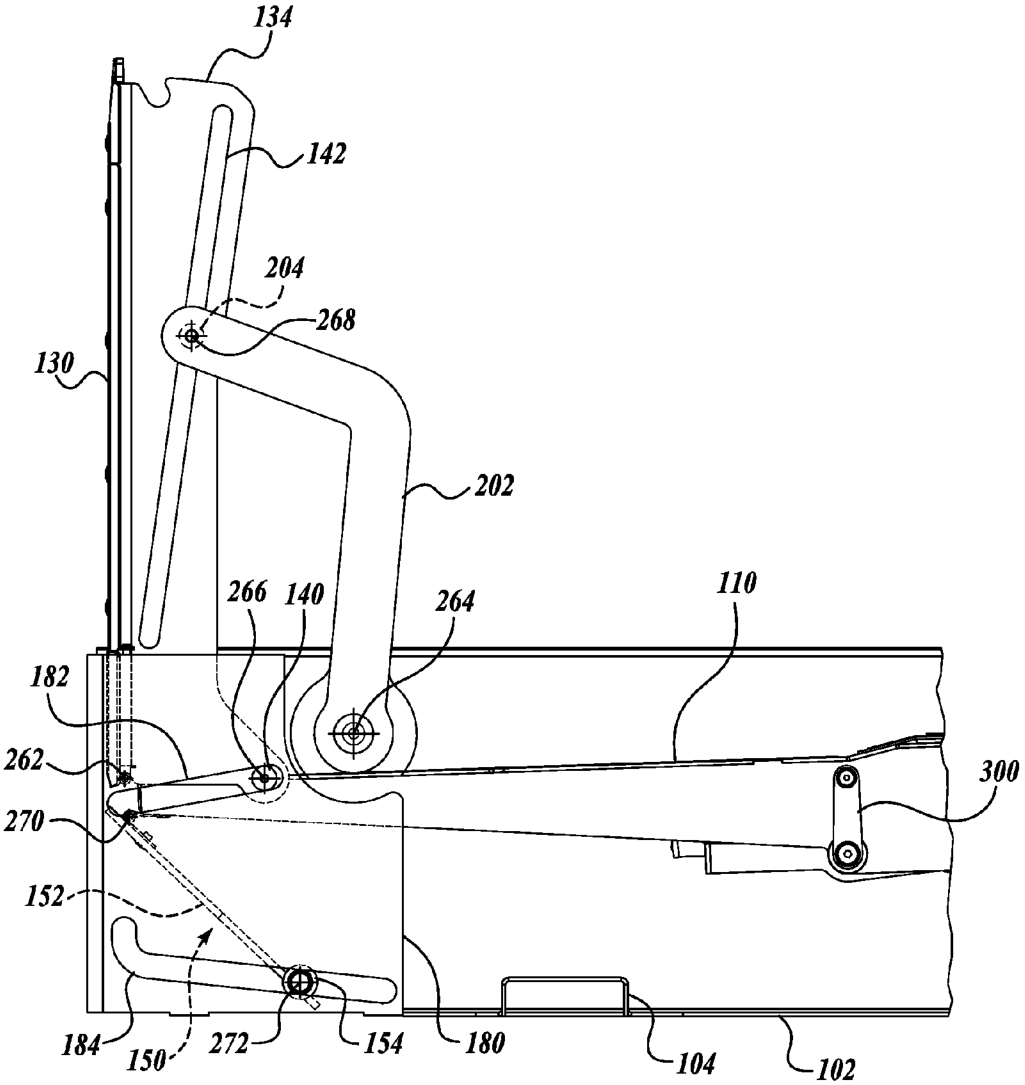
FIG. 12 shows a partial side view of the operable ramp of FIG. 11 in the transition position.
Figure 13:
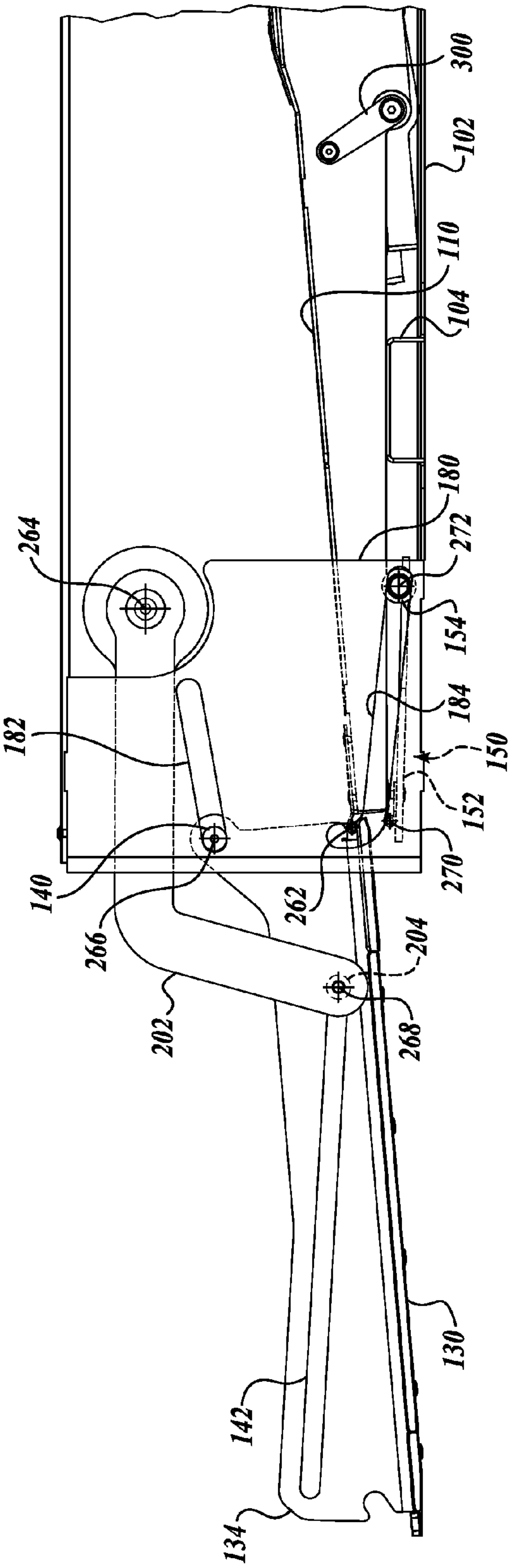
FIG. 13 shows a partial side view of the operable ramp of FIG. 11 in the deployed position.

In the illustrated embodiment, the support 180 is formed from sheet metal or plate and is positioned vertically along the side of the operable ramp 100. As best shown in FIGS. 11-13, an elongate slot 182 is formed in the support 180. The slot 182 is generally straight, and slopes downward toward the outer end at an angle of approximately 10° from horizontal. It will be appreciated that the shape and orientation of the slot 182 is exemplary, and other embodiments in which the slot is not straight and has a different orientation are contemplated, and such configurations should be considered within the scope of the present invention.

A cam follower 140 is coupled to the side curb 134 of the outer ramp 130 about axis 266. The cam follower 140 engages the slot 182 in the support 180 to slidingly couple the outer ramp 130 to the support. That is, the outer ramp 130 is rotatable about axis 266, which slides relative to the support 180 as the cam follower 140 moves within the slot 182. In the illustrated embodiment, the cam follower 140 is a roller bearing engaging the slot, however, any suitable cam follower, such as pin, may be utilized to maintain sliding or rolling engagement with the slot.

An elongate drive arm 202 is rotatably mounted about a fixed axis 264. As best shown in FIGS. 11-13, the drive arm 202 is L-shaped with a first end rotatably coupled to the frame 102 so that the second end moves along an arcuate path when the drive arm rotates about axis 264. The second end of the drive arm 202 slidingly engages the side curb 134 of the outer ramp 130.

In the illustrated embodiment, a cam follower 204 is positioned on the second end of the drive arm 202 about axis 268. The cam follower 204 engages an elongate slot 142 formed in the side curb 134.

The slot 142 and cam follower 204 configuration allows the drive arm 202 to drive the outer ramp 130 even though the axis of rotation 262 of the outer ramp is not coincident with the axis of rotation 264 of the drive arm 202. Moreover, this configuration allows for the position of axis 262 to change relative to that of axis 264 as the operable ramp 100 moves between the stowed and deployed positions. It should be appreciated that alternate configurations for engaging the drive arm 202 with the outer ramp 130 are possible. In one alternate embodiment, the cam follower is disposed on the outer ramp 130 and engages a slot formed in the drive arm. This and other alternate embodiments suitable for coupling the drive arm 202 to the outer ramp 130 to drive the operable ramp 100 between the stowed position and a deployed position are contemplated and should be considered within the scope of the present disclosure.

Figure 14:
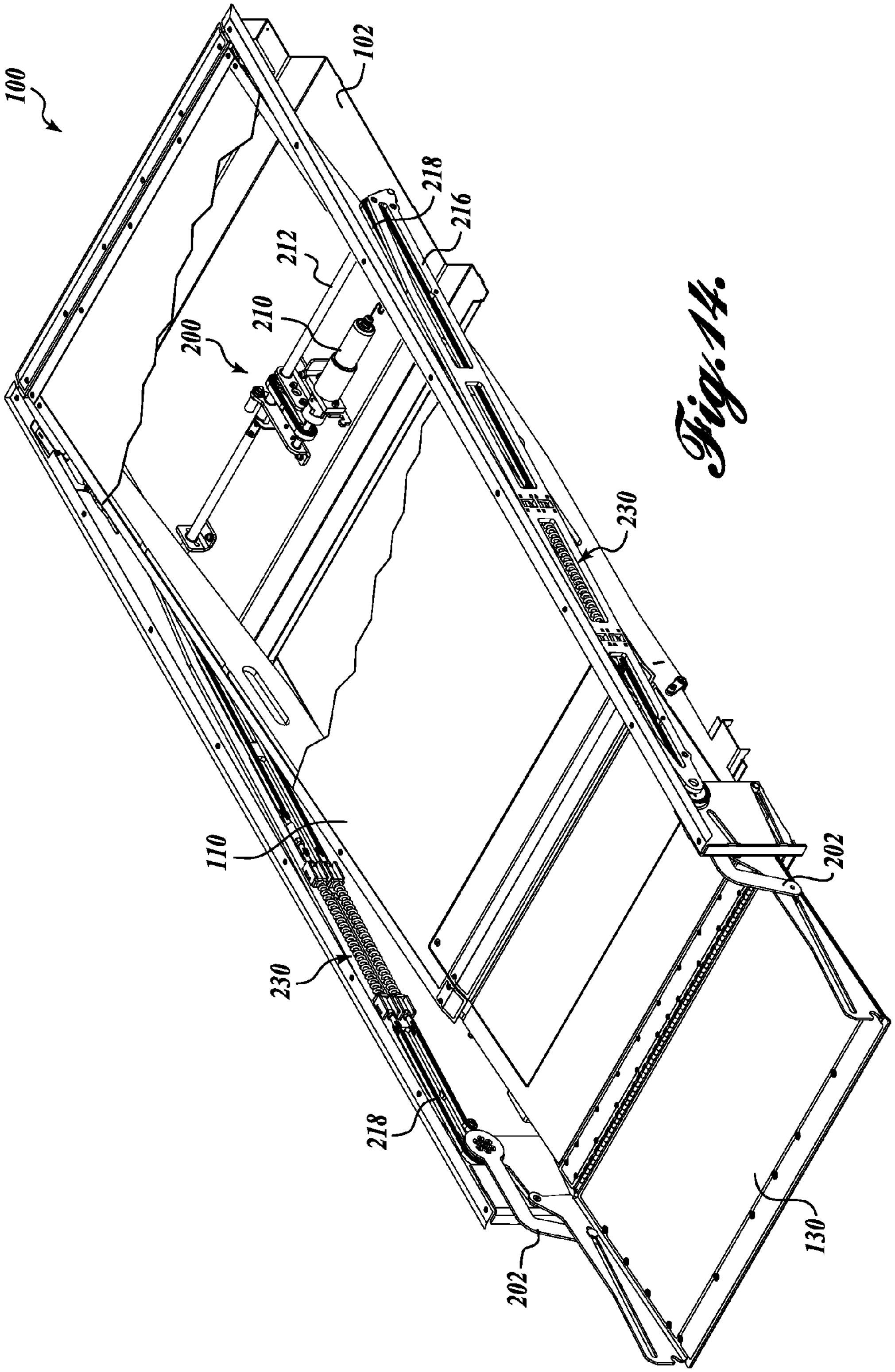
FIG. 14 shows a breakaway isometric view of the operable ramp of FIG. 1.
Figure 15:
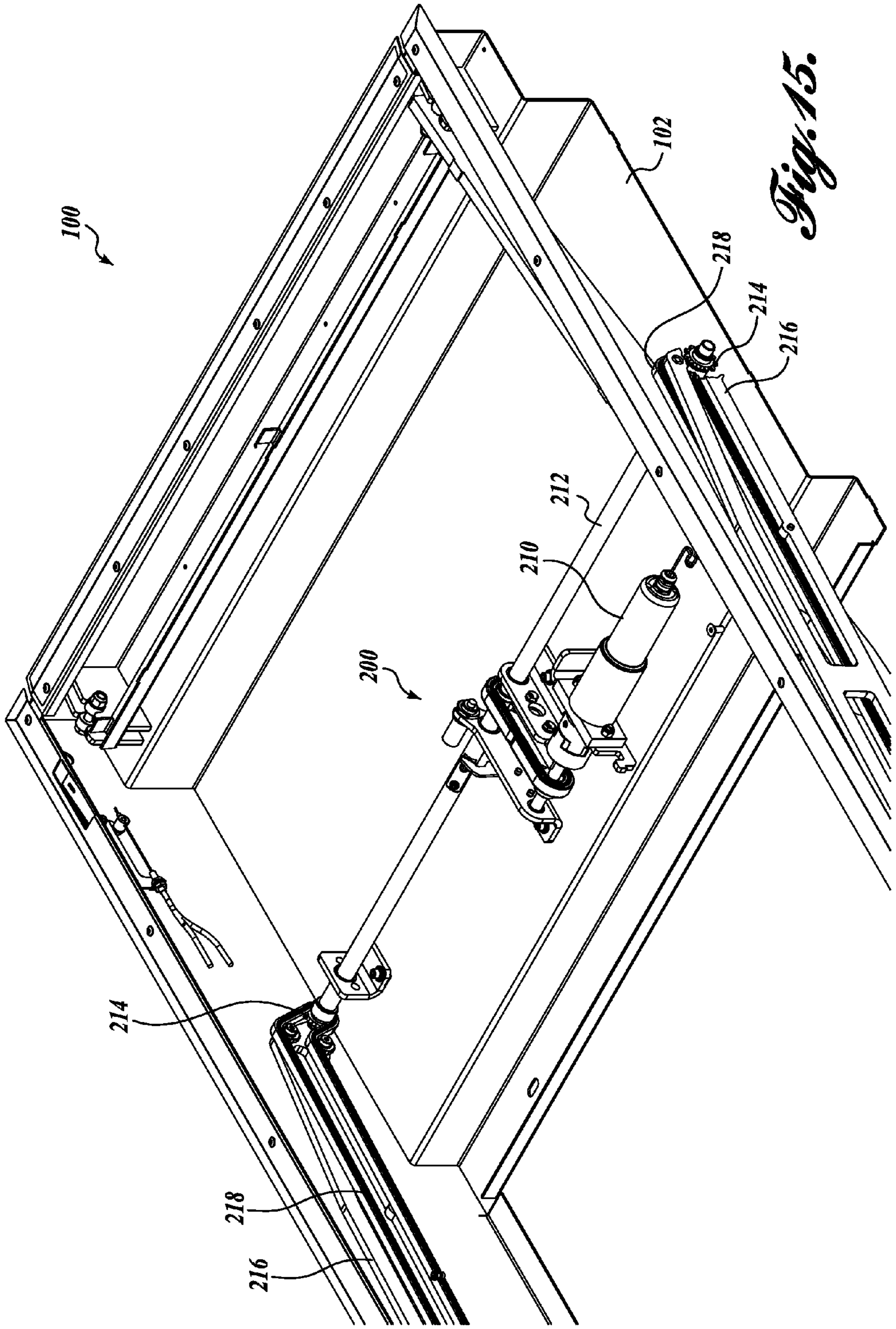
FIG. 15 shows a partial isometric view of a drive assembly of the operable ramp of FIG. 14.
Figure 16:
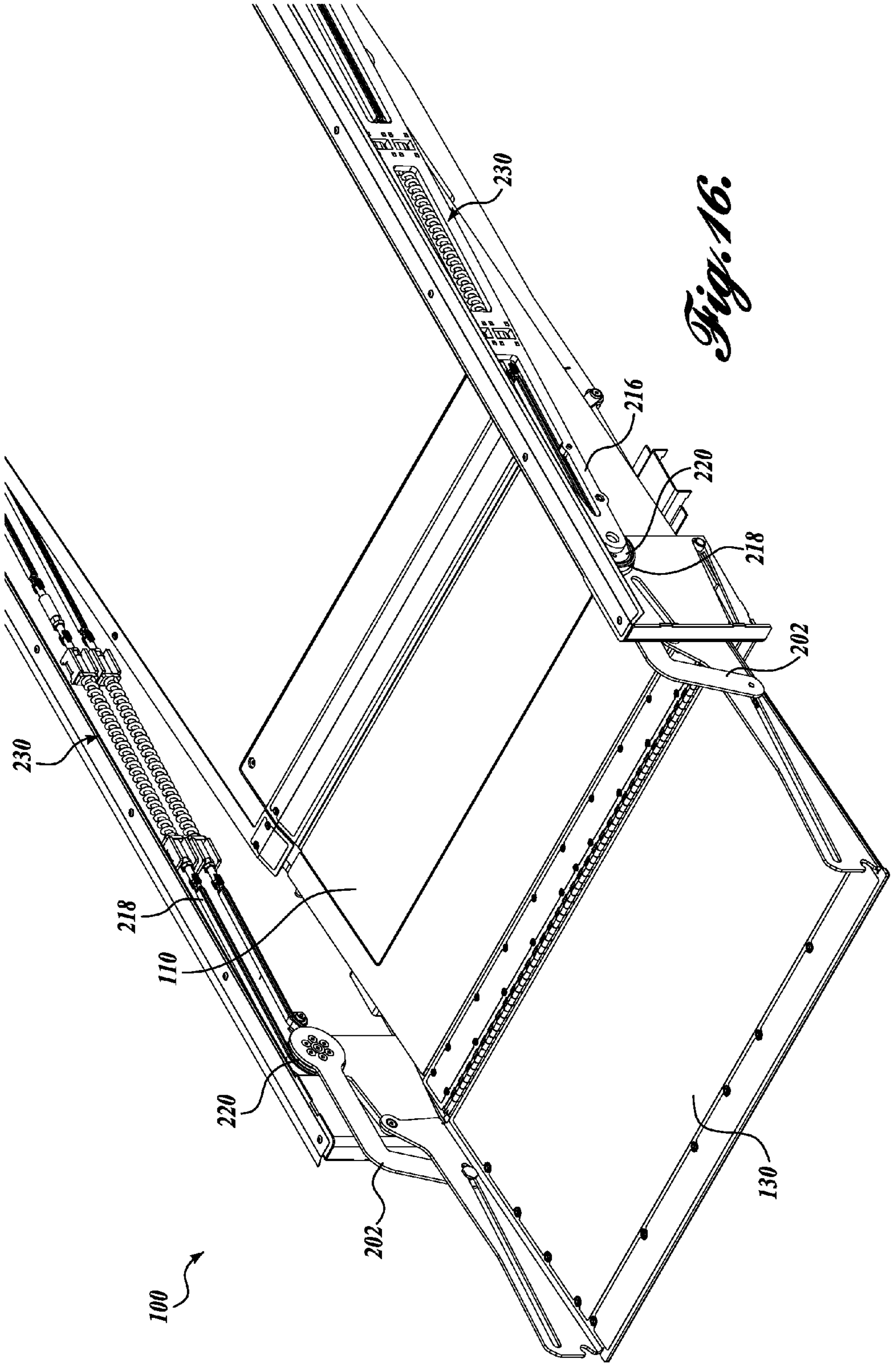
FIG. 16 shows a partial isometric view of the drive assembly of FIG. 14.

As shown in FIGS. 14-16, the disclosed drive assembly 200 is similar to the drive assembly disclosed in U.S. Pat. No. 7,681,272, issued to Morris et al., the disclosure of which is incorporated by reference herein. It will be appreciated that the drive assembly of Morris et al. is only one exemplary drive assembly suitable for use with the presently disclosed operable ramp, and that any number of other suitable drive assemblies can be utilized in conjunction with or in place of the drive assembly of Morris et al.

A first portion of the drive assembly 200 is located on one side of the frame 102, and a second portion of the drive assembly is similarly located on the other side of the frame 102. Each element of the first portion of the drive assembly 200 corresponds to a similar element of the second portion of the drive assembly. For the sake of clarity, one portion of the drive assembly 200 is described herein with the understanding that unless otherwise indicated, each element of the described portion has a corresponding element on the other portion of the drive assembly 200.

The drive assembly 200 includes an inner sprocket 214 and an outer sprocket 220 that are rotatably coupled to an elongate support 216 so that the axes of rotation of the sprockets are parallel to each other and the axis 264 of rotation of the drive arm 202. A drive chain assembly 218 forms an endless loop that engages the teeth of the inner sprocket 214 and the teeth of the outer sprocket 220. As a result, movement of the drive chain assembly 218 along the path of the endless loop rotates the inner sprocket 214 and the outer sprocket 220.

A drive shaft 212 is coupled to the inner sprocket 214, which acts as a drive sprocket, and also to a motor 210 by a well-known transmission assembly. The motor 210 is selectively operated by a controller to rotate the inner sprocket 214, thereby rotating the outer sprocket 220 via the drive chain assembly 218. In one embodiment, a single motor 210 drives the inner sprocket of the first portion of the drive assembly and also the inner sprocket of the second portion of the drive assembly. In another embodiment, each inner sprocket is driven by a separate motor.

The outer sprocket 220 is operably associated with the drive arm 202 so that rotation of the outer sprocket rotates the drive arm. In the illustrated embodiment, the inner sprocket 214 (drive sprocket) rotation is at a 1:1 ratio with the rotation of the outer sprocket 220 and, therefore, the drive arm 202. It will be appreciated that the inner sprocket 214 and outer sprocket 220 can be configured to provide rotation ratios that are greater than or less than 1:1.

The drive assembly 200 further includes an optional counterbalance assembly 230. The counterbalance assembly 230 can be any known counterbalance assembly that biases the operable ramp 100 toward the neutral position, i.e., that resists movement of the operable ramp away from the neutral position.

In the illustrated embodiment, the neutral position (FIG. 8) occurs when the outer ramp 130 has rotated approximately 35° from the stowed position. In this regard, the weight of the inner ramp 110 tends to move the operable ramp 100 toward the deployed position through the entire deployment motion. In contrast, the weight of the outer ramp 130 tends to move the operable ramp 100 toward the stowed position as ramp moves from the stowed position to an approximately vertical position. As the horizontal distance between the center of gravity (CG) of the outer ramp 130 and the center of rotation of the outer ramp decreases, the moment imparted by the outer ramp decreases. After the outer ramp has passed through the vertical position, i.e., the outer ramp is between the vertical position and the deployed position, the outer ramp 130 tends to move the operable ramp 100 toward the deployed position, with the moment imparted by the outer ramp increasing as the outer ramp rotates further from the approximately vertical position.

The moment imparted by the inner ramp 110 ($M_i$) and the moment imparted by the outer ramp 130 ($M_o$) are cumulative. These moments are transferred through the drive arm 202 and are reacted by the counterbalance 250. For configurations that do not have a counterbalance assembly 230, the moments are reacted by the motor 210.

When the operable ramp 100 is in the stowed position, $M_o$ is greater than $M_i$, so the combined moment tends to move the operable ramp 100 toward the stowed position. As the operable ramp 100 moves from the stowed position toward the deployed position, the changes in $M_i$ have a negligible effect on the net moment reacted by the counterbalance assembly 230, while $M_o$ decreases the net moment reacted by the counterbalance. $M_o$ decreases until it is approximately equal to at which point there is no net moment on the operable ramp. With no net moment on the operable ramp, no force is required by the motor 210 to maintain the position of the inner and outer ramps, i.e. the operable ramp is in the neutral position of FIG. 8.

As the operable ramp 100 continues to move toward the deployed position from the neutral position, $M_o$ continues to decrease as the outer ramp 130 approaches an approximately vertical position, at which point $M_o$=0. Because the change in $M_i$ has a negligible effect on the net moment reacted by the counterbalance assembly 230, the net moment on the operable ramp continues to increase. After the outer ramp 130 passes through the approximately vertical position, $M_o$ begins increasing and also influences the ramp in the same direction as M. Accordingly, the total moment tending to move the operable ramp toward the deployed position increases as the operable ramp moves from the neutral position to the deployed position.

By biasing the operable ramp 100 toward the neutral position, the counterbalance assembly counteracts some or all of the moments imparted by the weight of the inner and outer ramps 110 and 130, respectively, thereby reducing the actuating force required to reciprocate the operable ramp 100 between the stowed position and the deployed position. As a result, a smaller motor is required, and wear on the motor is reduced. One exemplary counterbalance suitable for use with the operable ramp is disclosed in U.S. Pat. No. 7,681,272, issued to Morris et al., previously incorporated by reference herein. It will be appreciated that the counterbalance of Morris et al. is only one exemplary counterbalance suitable for use with the presently disclosed operable ramp, and that any number of other suitable counterbalance assemblies can by utilized in conjunction with or in place of the counterbalance of Morris et al.

In the illustrated embodiment, the elongate slots and cam followers are configured such that the total moment on the operable ramp 100 imparted by the inner ramp 110 and outer ramp 130 ($M_o$+$M_i$) changes at an approximately linear rate throughout the deployment motion. Accordingly, the force required to counteract the total moment also changes at a linear rate, thereby allowing the counterbalance to utilize standard compression springs, which provide forces that also increase and decrease at a linear rate as the springs are compressed and relaxed.

Referring to FIGS. 7-13, the drive assembly 200 actuates the operable ramp 100 to move between the stowed position and a deployed position. More specifically, the drive assembly 200 selectively rotates the drive arm 202 to rotate the outer ramp 130, which in turn rotates the inner ramp 110.

Figure 7:
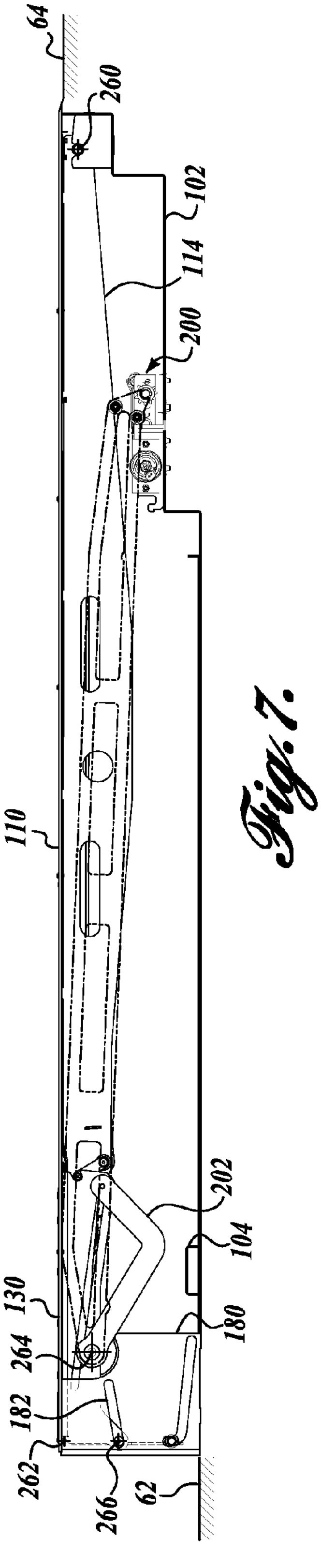
FIG. 7 shows a side view of the operable ramp of FIG. 1 in the stowed position.
Figure 8:
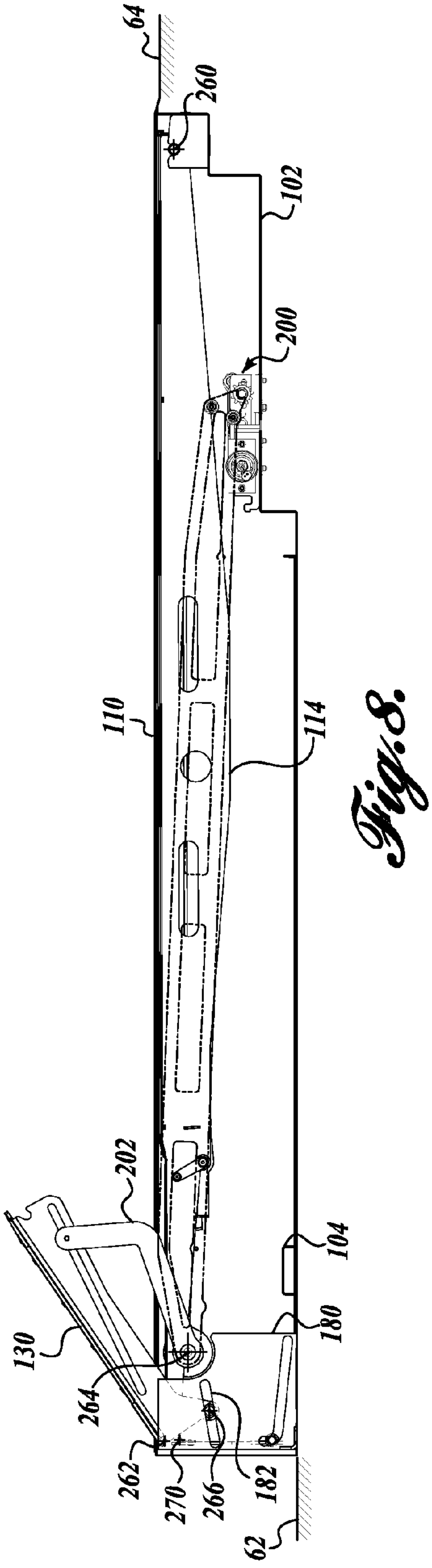
FIG. 8 shows a side view of the operable ramp of FIG. 7 in a neutral position.

Referring to FIGS. 7 and 11, when the operable ramp 100 is in the stowed position, cam followers 140 is in the outer lower end of slot 182. The engagement of the cam followers 140 with the slot 182 supports the hinged connection between the inner ramp 110 and the outer ramp 130 about axis 262. As a result, the position of the inner ramp 110 is established by the fixed position of axis 260 at the inner end and the support of axis 262 at the outer end. The outer ramp 130 is disposed over and supported by the inner ramp 110. In addition, because slot 182 slopes downward toward the outer end of the operable ramp 100, any downward force applied to the inner ramp 110 tends to rotate the outer ramp 130 toward the stowed position, which prevents the outer ramp from rising when a person walks on the operable ramp surface. As shown in FIGS. 11-13, a latch assembly 300 is optionally included to selectively engage the outer ramp to secure it in the stowed position.

Deployment of the operable ramp 100 from the stowed position of FIGS. 7 and 11 to the deployed position of FIGS. 10 and 13 includes two phases. During the first phase, the drive assembly 200 rotates the drive arm 202 in a counterclockwise direction as viewed in FIGS. 7-13. The cam follower 204 of the drive arm 202 engages the slot 142 in the side curb 134 to rotate the outer ramp 130 relative to the inner ramp 110 about axis 262. Because the distance between axis 262 and axis 260 is fixed, rotation of the inner ramp 110 about axis 260 moves axis 262 along an arcuate path. The distance between axis 262 and axis 266 is also fixed, so movement of axis 262 along the arcuate path moves cam follower 140 along elongate slot 182. Thus axis 262 drops, thereby lowering the outer end of the inner ramp 110, and cam follower 140 moves inward along the slot 182 to rotate the outer ramp 130 about axis 262.

Figure 9:
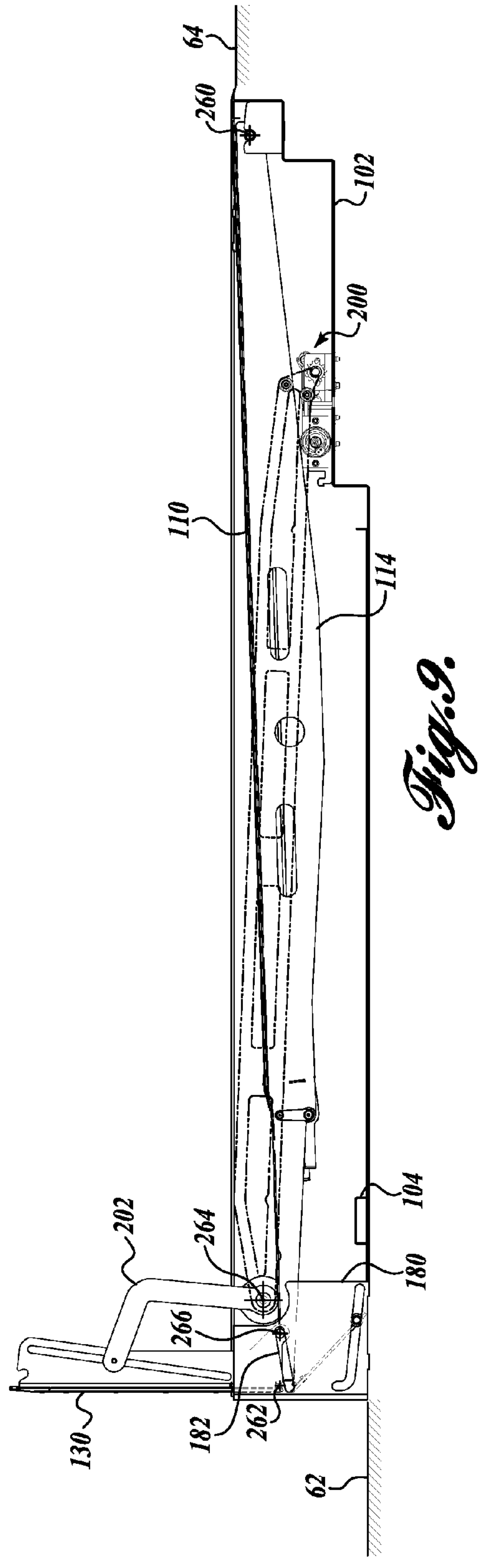
FIG. 9 shows a side view of the operable ramp of FIG. 7 in the transition position.

The first phase ends when the operable ramp 100 reaches the transition position, shown in FIGS. 9 and 12. In the transition position, the cam follower 140 has reached its innermost position. That is, further movement of the operable ramp 100 toward the deployed position will cause the cam follower 140 to reverse direction, i.e., move in an outward direction along slot 182. In the illustrated embodiment, the outer ramp 130 extends upward in a generally vertical orientation, however, it will be appreciated that the position of the outer ramp can vary in the transition position for different embodiments, and the illustrated embodiment should not be considered limiting.

During the second phase of the deployment motion, the operable ramp 100 moves from the transition position of FIGS. 9 and 12 to the deployed position of FIGS. 10 and 13. As the drive arm 202 continues to rotate in the counterclockwise direction (as viewed in FIGS. 7-13), the cam follower 204 of the drive arm continues to rotate the outer ramp 130 relative to the inner ramp 110 about axis 262. Rotation of the outer ramp 130 relative to the inner ramp 110 lowers axis 262 and moves cam follower 140 along elongate slot 182 toward the outer end of the operable ramp 100.

As the operable ramp 100 moves through the second deployment phase, the inner ramp 110 rotates relative to axis 260 and the outer ramp 130 rotates relative to the inner ramp about axis 262 until the operable ramp reaches the deployed position of FIGS. 10 and 13. In the deployed position, the inner ramp 110 is supported by a portion of the frame 102. More specifically, the lower surface of the inner panel supports 114 rest on a C-shaped channel 104 that forms part of the frame 102. Thus, the inner ramp 110 is supported in the deployed position, which in turn supports the outer panel 130.

Referring to FIGS. 11-13, the operable ramp 100 includes a closeout assembly 150 that acts as a riser when the operable ramp is in the stowed position (FIG. 11) and folds under the inner ramp 110 as the operable ramp moves to the deployed position (FIG. 13). The closeout assembly 150 includes a flat panel 152 rotatably coupled at a first end to the inner ramp 110 about an axis 270. A cam follower 154 is coupled to a second end of the flat panel 152 about axis 272 such that axis 272 is parallel to axis 270. The cam follower 154 engages a slot 184 formed in support 180. In the stowed position, axis 270 and the engagement of the cam follower 154 with the slot 184 positions the panel 152 in a vertical orientation that extends from the upper surface of the operable ramp 100 to the lower first surface 62, thereby forming a riser to the step formed by the operable ramp.

As the operable ramp 100 moves to the deployed position, axis 270 and, therefore, the first end of the flat panel 152, move in a downward direction with the inner ramp 110. Movement of the second end of the flat panel 152 is controlled by the cam follower 154, which moves along the slot 184 in an inward direction. As a result, the closeout assembly 150 folds underneath the inner ramp 110, out of the way of the transition surface provided by the deployed operable ramp 100. When the operable ramp is in the deployed position, because of the sloped configuration of slot 182, a downward force on the inner ramp 110 tends to rotate the outer ramp 130 toward the deployed position, thereby preventing the outer ramp from rising when a person is on the inner ramp.

While illustrative embodiments have been illustrated and described, it will be appreciated that various changes can be made therein without departing from the spirit and scope of the invention.

The embodiments of the invention in which an exclusive property or privilege is claimed are defined as follows:

1. An operable ramp moveable between a step configuration in a stowed position and a ramp configuration in a deployed position, the operable ramp comprising:

(a) a support element;

(b) an inner ramp, a first end of the inner ramp rotatable about a first axis, (c) an outer ramp rotatably coupled to a second end of the inner ramp about a second axis, the outer ramp slidingly engaging the support element; and (d) a drive arm rotatable about a third axis and slidingly engaging the outer ramp, the drive arm selectively moving the operable ramp between the stowed position and the deployed position, wherein (1) the outer ramp is horizontally disposed above the inner ramp when the operable ramp is in the stowed position, and (2) the outer ramp extends outwardly from the second end of the inner ramp to form an inclined transition between a first surface and a second surface when the operable ramp is in the deployed position.

2. The operable ramp of claim 1 further comprising a cam follower coupled to the drive arm and a slot formed in the outer ramp, the cam follower slidingly engaging the slot.

3. The operable ramp of claim 1, further comprising a cam follower coupled to the outer ramp and a slot formed in the support element, the cam follower slidingly engaging the slot.

4. The operable ramp of claim 3, wherein a first end of the slot is lower than a second end of the slot.

5. The operable ramp of claim 3, wherein the cam follower moves in a first direction in the slot during a first part of a deployment motion and in a second direction opposite the first direction during a second part of the deployment motion.

6. The operable ramp of claim 1, further comprising a panel rotatably coupled to the inner ramp, the panel extending downward from the inner ramp when the operable ramp is in the stowed position.

* * * * *